Patented May 5, 1942

2,281,968

UNITED STATES PATENT OFFICE 2,281,968

SULPHUR DYESTUFFS

Werner Zerweck and Karl Schütz, Frankfort-on-the-Main-Fechenheim, and Wilhelm Hechtenberg, Frankfort-on-the-Main, Germany, assignors to General Aniline & Film Corporation, New York, N. Y., a corporation of Delaware No Drawing. Application October 24, 1940, Serial No. 362,600. In Germany October 7, 1939

2 Claims. (Cl. 260—129)

Our present invention relates to sulphur dyestuffs more particularly to those obtained by acting with a sulphurizing agent on a 4,5,9,10-dibenzo-3,8-diazapyrene compound.

The process of sulphurization may be carried out by one of the usual methods such as by treatment with a sulphur and/or sulphur dichloride or a polysulphide solution in the presence or absence of a copper compound and isolating the reaction product in the usual manner.

The present dyestuffs dye the vegetable fibers mostly brownish to olive shades of valuable fastness properties.

In order to further illustrate our invention the following examples are given, the parts being by weight and all temperatures in degree centigrade.

Example 1

100 parts of 4,5,9,10-dibenzo-3,8-diazapyrene of the formula:

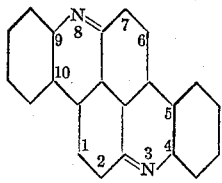

obtainable for instance according to Clemo and Dawson (Journ. Chem. Soc. 1939, page 1114) are mixed with 600 parts of sulphur dichloride and 30 parts of sulphur and the mixture is slowly heated to boiling and boiled for about one hour in an apparatus provided with a reflux condenser. Then the sulphur dichloride is distilled off and the temperature of the reaction mass is slowly increased to 270 to 280°. The mass is held at this temperature for about 6 hours and then cooled down. The molten mass is pulverized and dissolved in the usual manner by heating with a sodium sulphide and caustic soda solution. The solution thus obtained is purified by filtration and the formed dyestuff is isolated by acidification or by blowing in air. The dyestuff is when dry a brown powder and dyes cotton from the sodium sulphide bath bright yellowish brown shades of good fastness properties.

Example 2

20 parts of 4,5,9,10-dibenzo-3,8-diazapyrene are mixed with about 80 parts of sulphur and the mixture is baked at about 260° for about 24 hours. The raw product thus obtained is dissolved in the usual manner by means of a sodium sulphide and caustic soda solution. The solution is diluted with water and purified by filtration and the dyestuff is separated therefrom by acidification. The dyestuff is when dry a black powder and dyes the vegetable fibers from the sodium sulphide bath fast dark brown shades.

When carrying out the sulphurization in the presence of a copper compound a similar dyestuff of a more yellowish brown shade is obtained.

Example 3

To a boiling polysulphide solution prepared from 56 parts of crystallized sodium sulphide and 32 parts of sulphur there are added 20 parts of dinitrodibenzo-diazapyrene obtainable by nitrating the 4,5,9,10-dibenzo-3,8-diazapyrene with two molecular proportions of nitric acid in the presence of concentrated sulphuric acid. The reaction mixture is boiled some time at about 118° in an apparatus provided with a reflux condenser and then evaporated. The dry residue is then heated for about 4 hours at 280 to 300° in a baking oven. Then the molten mass is stirred with a sodium chloride solution of 10° Bé. and the formed dyestuff is isolated by filtration, washing and drying as a black powder. It dyes the vegetable fibers from the sodium sulphide bath brownish olive shades of good fastness.

When baking the intermediate with the addition of benzidine the formed dyestuff dyes olive-brown shades.

We claim:

1. Sulphur dyestuffs obtained by acting with a sulphurizing agent on a 4,5,9,10-dibenzo-3,8-diazapyrene compound, which dyestuffs dye the vegetable fibers from the sodium sulphide bath mostly brownish to olive shades of valuable fastness properties.

2. A sulphur dyestuff obtained by acting with sulphur on 4,5,9,10-dibenzo-3,8-diazapyrene of the formula:

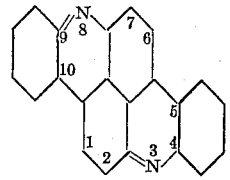

at about 260° and dissolving the raw product by means of a sodium sulphide and caustic soda solution, which dyestuff dyes the vegetable fibers from the sodium sulphide bath fast dark brown shades.

WERNER ZERWECK.
KARL SCHÜTZ.
WILHELM HECHTENBERG.